United States Patent
Leque et al.

(10) Patent No.: US 11,248,523 B2
(45) Date of Patent: Feb. 15, 2022

(54) DUAL CLUTCH TRANSMISSION FOR ACCESSORY GEARBOX DRIVE

(71) Applicant: UNITED TECHNOLOGIES CORPORATION, Farmington, CT (US)

(72) Inventors: Nicholas D. Leque, Vernon, CT (US); Joseph H. Polly, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 153 days.

(21) Appl. No.: 16/676,112

(22) Filed: Nov. 6, 2019

(65) Prior Publication Data
US 2021/0131347 A1 May 6, 2021

(51) Int. Cl.
- *F02C 7/36* (2006.01)
- *F02C 3/113* (2006.01)
- *F16H 37/02* (2006.01)
- *F16H 63/02* (2006.01)

(52) U.S. Cl.
CPC ................ *F02C 3/113* (2013.01); *F02C 7/36* (2013.01); *F16H 37/022* (2013.01); *F16H 2063/025* (2013.01)

(58) Field of Classification Search
CPC .... F02C 3/113; F02C 7/36; F02C 7/32; F05D 2270/061; F16H 2063/025
See application file for complete search history.

(56) References Cited

U.S. PATENT DOCUMENTS

| | | | |
|---|---|---|---|
| 4,947,970 A | 8/1990 | Miller et al. | |
| 7,942,079 B2 | 5/2011 | Russ | |
| 8,350,398 B2 | 1/2013 | Butt | |
| 8,500,583 B2 | 8/2013 | Goi et al. | |
| 8,876,650 B2 | 11/2014 | Lemmers, Jr. | |
| 10,328,799 B2 | 6/2019 | Duong | |
| 2002/0033059 A1* | 3/2002 | Pels | F16H 63/22 74/329 |
| 2007/0130959 A1* | 6/2007 | Linet | F02C 3/113 60/802 |
| 2008/0200299 A1* | 8/2008 | Russ | F02C 7/32 475/331 |
| 2018/0202310 A1 | 7/2018 | Suciu et al. | |
| 2018/0209513 A1 | 7/2018 | Lemmers, Jr. | |
| 2018/0223740 A1 | 8/2018 | Forest et al. | |
| 2019/0284948 A1 | 9/2019 | Scothern | |
| 2020/0309037 A1* | 10/2020 | Bortoli | F02C 7/32 |

FOREIGN PATENT DOCUMENTS

| | | |
|---|---|---|
| EP | 0251289 | 1/1988 |
| EP | 3438431 | 2/2019 |

OTHER PUBLICATIONS

European Patent Office, European Search Report dated Mar. 19, 2021 in Application No. 20205779.0.

* cited by examiner

*Primary Examiner* — Gerald L Sung
(74) *Attorney, Agent, or Firm* — Snell & Wilmer L.L.P.

(57) ABSTRACT

A power extraction system for a gas turbine engine may comprise a low spool transmission and a low spool accessory gearbox. The low spool accessory gearbox may comprise a generator and a dual clutch transmission. The dual clutch transmission may be coupled between the low spool transmission and the generator.

18 Claims, 7 Drawing Sheets

DUAL CLUTCH TRANSMISSION FOR ACCESSORY GEARBOX DRIVE

FIELD

The present disclosure relates generally to gas turbine engines and, more specifically, to systems and methods for low spool power extraction.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. A high spool generally connects the high pressure compressor and high pressure turbine sections of the engine. A low spool generally connects the fan, low pressure compressor, and low pressure turbine sections of the engine.

Increasing engine bypass ratios and/or the electrical needs of an aircraft tend to increase demand on the engine's compressor section to perform under increased loading. Current engine architectures generally extract power from a high spool connecting the high pressure compressor and high pressure turbine sections of the engine. Excessive power extraction from the high spool may reduce the operability of the compressor, particularly, during engine idle conditions, and may degrade an overall performance of the engine. Thus, it may be desirable to extract power from the low spool, which connects the fan, low pressure compressor, and low pressure turbine sections of the engine. However, the low spool tends to experience a wide range of rotational speeds, which can be problematic for accessories (e.g., generators) that benefit from a relatively constant speed.

SUMMARY

A power extraction system for a gas turbine engine is disclosed herein. In accordance with various embodiments, the power extraction system may comprise a low spool transmission and a low spool accessory gearbox. The low spool accessory gearbox may comprise a generator and a dual clutch transmission coupled between the low spool transmission and the generator.

In various embodiments, the dual clutch transmission may comprise a first clutch, a first transmission shaft operationally coupled to the first clutch and including a first gear, a second clutch, a second transmission shaft operationally coupled to the second clutch and including a second gear, and a countershaft including a first counter gear configured to engage the first gear and a second counter gear configured to engage the second gear.

In various embodiments, the dual clutch transmission may further comprise a third gear mounted to the first transmission shaft, and a fourth gear mounted to the second transmission shaft.

In various embodiments, an output gear of the countershaft may be configured to drive a rotation of an input shaft of the generator. In various embodiments, the low spool transmission may comprise a low tower shaft and a low lay shaft rotationally coupled to the low tower shaft. The low lay shaft may form an input shaft of the dual clutch transmission.

In various embodiments, the power extraction system may further comprise a high spool transmission and a high accessory gearbox including a first accessory operationally coupled to the high spool transmission.

In various embodiments, the high spool transmission may comprise a high tower shaft and a high lay shaft rotationally coupled to the high tower shaft. The high accessory gearbox may comprise a gear train. The gear train may include an input gear rotationally coupled to high lay shaft.

A gas turbine engine is also disclosed herein. In accordance with various embodiments, the gas turbine engine may comprise a high spool and a low spool. A high spool transmission may be mechanically coupled to the high spool. A low spool transmission may be mechanically coupled to the low spool. A low accessory gearbox of the gas turbine engine may comprise a generator and a dual clutch transmission coupled between the low spool transmission and the generator.

In various embodiments, the dual clutch transmission may comprise a first clutch, a first transmission shaft operationally coupled to the first clutch and including a first gear, a second clutch, a second transmission shaft operationally coupled to the second clutch and including a second gear, and a countershaft including a first counter gear configured to engage the first gear and a second counter gear configured to engage the second gear.

In various embodiments, a controller may be operationally coupled to the first clutch and the second clutch. A tangible, non-transitory memory may be configured to communicate with the controller. The tangible, non-transitory memory has instructions stored thereon that, in response to execution by the controller, cause the controller to perform operations, which may comprise determining, by the controller, a rotational speed of at least one of the low spool transmission or the low spool; and determining, by the controller, a desired gear ratio of the dual clutch transmission based on the rotational speed of the at least one of the low spool transmission or the low spool.

In various embodiments, the operations may further comprise determining, by the controller, if the desired gear ratio of the dual clutch transmission matches a current gear ratio of the dual clutch transmission; commanding, by the controller, the first clutch to engage if the desired gear ratio of the dual clutch transmission does not match the current gear ratio of the dual clutch transmission; and commanding, by the controller, the second clutch to disengage if the desired gear ratio of the dual clutch transmission does not match the current gear ratio of the dual clutch transmission.

In various embodiments, the dual clutch transmission may further comprise a third gear mounted to the first transmission shaft; and a fourth gear mounted to the second transmission shaft. In various embodiments, the low spool transmission may comprise a low tower shaft rotationally coupled to the low spool, and a low lay shaft rotationally coupled to the low tower shaft. The low lay shaft may form an input shaft of the dual clutch transmission.

In various embodiments, an output gear of the countershaft may be configured to engage an input gear of the generator. In various embodiments, the high spool transmission may comprise a high tower shaft rotationally coupled to the high spool, a high lay shaft rotationally coupled to the high tower shaft, and a high spool accessory gearbox. The high spool accessory gearbox may include a first accessory and a gear train operationally coupled to the first accessory.

The gear train may include an input gear rotationally coupled to the high lay shaft.

A method of forming a power extraction system for a gas turbine engine is also disclosed herein. In accordance with various embodiments, the method may comprise coupling a low spool transmission to a low spool of the gas turbine engine, and coupling a dual clutch transmission to the low spool transmission. The dual clutch transmission may comprise a first clutch, a first transmission shaft operationally coupled to the first clutch and including a first gear, a second clutch, a second transmission shaft operationally coupled to the second clutch and including a second gear, and a countershaft including a first counter gear configured to engage the first gear and a second counter gear configured to engage the second gear. The method may further comprise rotationally coupling an output gear of the countershaft to an input gear of an accessory of a low accessory gearbox.

In various embodiments, method may further comprise operationally coupling a controller to the dual clutch transmission. The controller may include a tangible, non-transitory memory configured to communicate with the controller, the tangible, non-transitory memory having instructions stored thereon that, in response to execution by the controller, cause the controller to perform operations which may comprise determining, by the controller, a rotational speed of at least one of the low spool transmission or the low spool; and determining, by the controller, a desired gear ratio of the dual clutch transmission based on the rotational speed of the at least one of the low spool transmission or the low spool.

In various embodiments, the operations may further comprise: determining, by the controller, if the desired gear ratio of the dual clutch transmission matches a current gear ratio of the dual clutch transmission; commanding, by the controller, the first clutch to engage if the desired gear ratio of the dual clutch transmission does not match the current gear ratio of the dual clutch transmission; and commanding, by the controller, the second clutch to disengage if the desired gear ratio of the dual clutch transmission does not match the current gear ratio of the dual clutch transmission.

In various embodiments, determining, by the controller, the rotational speed of the at least one of the low spool transmission or the low spool may comprise receiving, by the controller, a signal from a sensor configured to measure an operating condition of the gas turbine engine. In various embodiments, the accessory of the low accessory gearbox may comprise a generator.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

A first component that is "radially outward" of a second component means that the first component is positioned a greater distance away from a common axis of the first and second components as compared to the second component. A first component that is "radially inward" of a second component means that the first component is positioned closer to a common axis of the first and second components than the second component.

Power extraction systems of the present disclosure may include a low spool transmission configured to transfer torque between a low spool of a gas turbine engine and a low accessory gearbox of the gas turbine engine. The low spool transmission may include a dual clutch transmission (DCT). In various embodiments, the DCT may be connected to a generator of the low accessory gearbox. In various embodiments, a controller may be operationally coupled to the DCT. The controller may control gear shifting of the DCT based on low spool speed. The DCT may allow for low spool power extraction, while reducing idle thrust and idle exhaust temperatures, which tends to increase a compressor stall margin.

Figure 1:
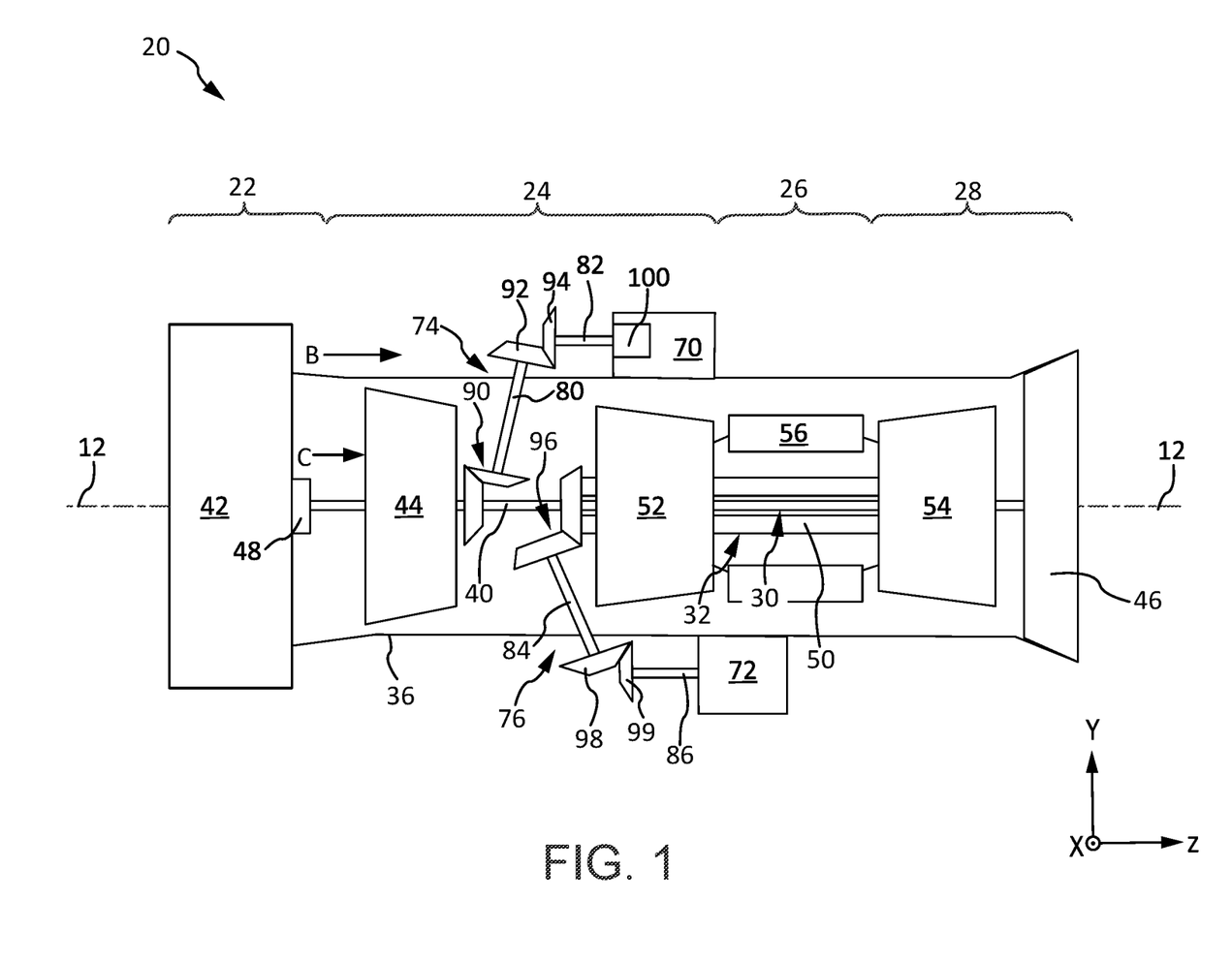
FIG. 1 illustrates a schematic view of an exemplary gas turbine engine, in accordance with various embodiments.

With reference to FIG. 1, a gas turbine engine 20 is shown accordance with various embodiments. Gas turbine engine 20 may be a two-spool turbofan that generally incorporates a fan section 22, a compressor section 24, a combustor section 26, and a turbine section 28. In operation, fan section 22 can drive fluid (e.g., air) along a path of bypass airflow B while compressor section 24 can drive fluid along a path of core airflow C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Fan section 22, compressor section 24, combustor section 26, and turbine section 28 are arranged sequentially along an engine central longitudinal axis 12. Engine central longitudinal axis 12 is oriented in the z direction on the provided x-y-z axes.

Gas turbine engine 20 may generally comprise a low spool 30 and a high spool 32 mounted for rotation about engine central longitudinal axis 12. Low spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than inner shaft 40.

High spool 32 may comprise an outer shaft 50 that interconnects a high pressure compressor 52 and a high pressure turbine 54. A combustor 56 may be located between high pressure compressor 52 and high pressure turbine 54. Inner shaft 40 and outer shaft 50 may be concentric and may rotate via bearing systems about the engine central longitudinal axis 12, which is collinear with their longitudinal axes. As used herein, a "high pressure" compressor or turbine experiences a higher pressure than a corresponding "low pressure" compressor or turbine.

The core airflow C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low spool 30 and high spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of fan 42 may be significantly larger than that of low pressure compressor 44, and low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, or may comprise any gas turbine engine as desired.

Gas turbine engine 20 may also include a low (or first) accessory gearbox 70, a high (or second) accessory gearbox 72, a low spool transmission 74, and a high spool transmission 76. In various embodiments, low accessory gearbox 70 and/or high accessory gearbox 72 may be mounted to an engine case 36 or other static structure of gas turbine engine 20. Low spool transmission 74 may be configured to mechanically couple and thereby transfer rotational energy (e.g., torque) between inner shaft 40 of low spool 30 and one or more components of low accessory gearbox 70. High spool transmission 76 may be configured to mechanically couple and thereby transfer rotational energy (e.g., torque) between outer shaft 50 of high spool 32 and one or more components of high accessory gearbox 72.

In various embodiments, low spool transmission 74 may comprise a low tower shaft 80 and a low lay shaft 82. High spool transmission 76 may comprise a high tower shaft 84 and a high lay shaft 86. Low tower shaft 80 may extend between inner shaft 40 and low lay shaft 82. A first end of low tower shaft 80 may be mechanically coupled to a geared system 90 configured to transfer torque between inner shaft 40 and low tower shaft 80. A second end of low tower shaft 80 may be mechanically coupled to a gear 92. Stated differently, gear 92 may be mounted to low tower shaft 80 by, for example, splined interface. Gear 92 may engage (e.g., may be meshed with) a gear 94 mounted, for example, by splined interface, to a first end of low lay shaft 82. As described in further detail below, low lay shaft 82 may form the input shaft of a DCT 100 of low accessory gearbox 70.

In various embodiments, high spool transmission 76 may comprise a high tower shaft 84 and a high lay shaft 86. High tower shaft 84 may extend between outer shaft 50 and high lay shaft 86. A first end of high tower shaft 84 may be mechanically coupled to a geared system 96 configured to transfer torque between outer shaft 50 and high tower shaft 84. A second end of high tower shaft 84 may be mechanically coupled to a gear 98. Stated differently, gear 98 may be mounted to high tower shaft 84 by, for example, splined interface. Gear 98 may engage (e.g., may be meshed with) a gear 99 mounted, for example, by splined interface, to a first end of high lay shaft 86. As described in further detail below, low lay shaft 82 may form the input shaft of a gear train of low accessory gearbox 70.

Figure 2A:
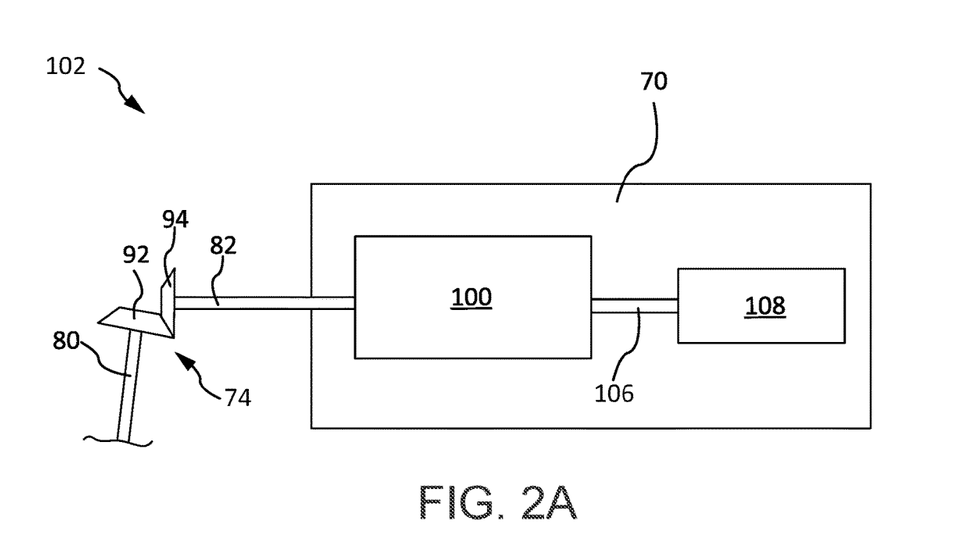
FIG. 2A illustrates a schematic of a low spool transmission and low accessory gearbox of a power extraction system, in accordance with various embodiments.

FIG. 2A illustrates a power extraction system 102 for a gas turbine engine, in accordance with various embodiments. Power extraction system 102 may comprise low spool transmission 74 and one or more components of low accessory gearbox 70. In accordance with various embodiments, a second end of low lay shaft 82 may be connected to a DCT 100 of low accessory gearbox 70. In this regard, low lay shaft 82 may form an input shaft of DCT 100. An output 106 of DCT 100 may be mechanically coupled to an accessory 108 of low accessory gearbox 70. In various embodiments, accessory 108 is a generator. Output 106 (e.g., an output shaft) of DCT 100 may drive rotation of generator 108. As described in further detail below, DCT 100 may be configured such that a rotational speed (e.g., revolutions per minute (RPM)) of output 106 remains relatively constant regardless of the rotational speed (RPM) of low lay shaft 82 and/or inner shaft 40 in FIG. 1. While a single accessory 108 is illustrated as being driven by output 106 of DCT 100, it is further contemplated and understood that low accessory gearbox 70 may include any number of accessories, which may be driven by output 106 of DCT 100.

Figure 2B:
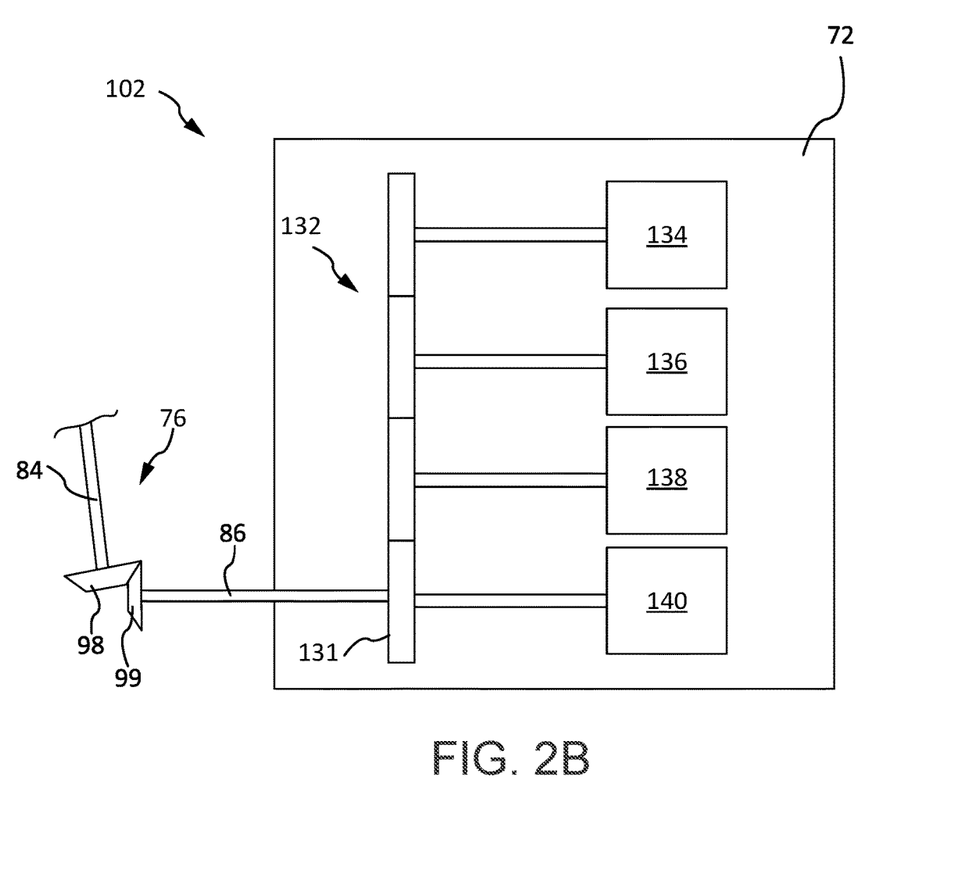
FIG. 2B illustrates a schematic of a high spool transmission and a high accessory gearbox of a power extraction system, in accordance with various embodiments.

With reference to FIG. 2B, in various embodiments, power extraction system 102 may comprise high spool transmission 76 and one or more components of high accessory gearbox 72. In accordance with various embodiments, a second end of high lay shaft 86 may be connected, for example, via splined interface, to an input gear 131 of a gear train 132 of high accessory gearbox 72. Gear train 132 is operationally coupled to and/or configured to drive accessories 134, 136, 138, and 140 of high accessory gearbox 72. In various embodiments, accessory 134 is fuel pump, accessory 136 is an oil pump, accessory 138 is an air turbine starter (ATS), and accessory 140 is a permanent magnet alternator (PMA). While low accessory gearbox 70 is illustrated as including accessories 134, 136, 138, and 140, it is further contemplated and understood that high accessory gearbox 72 may include additional accessories driven by gear train 132 and/or that one or more of accessories 134, 136, 138, and 140 may instead be located in low accessory gearbox 70 and driven by output 106 of DCT 100.

Figure 3:
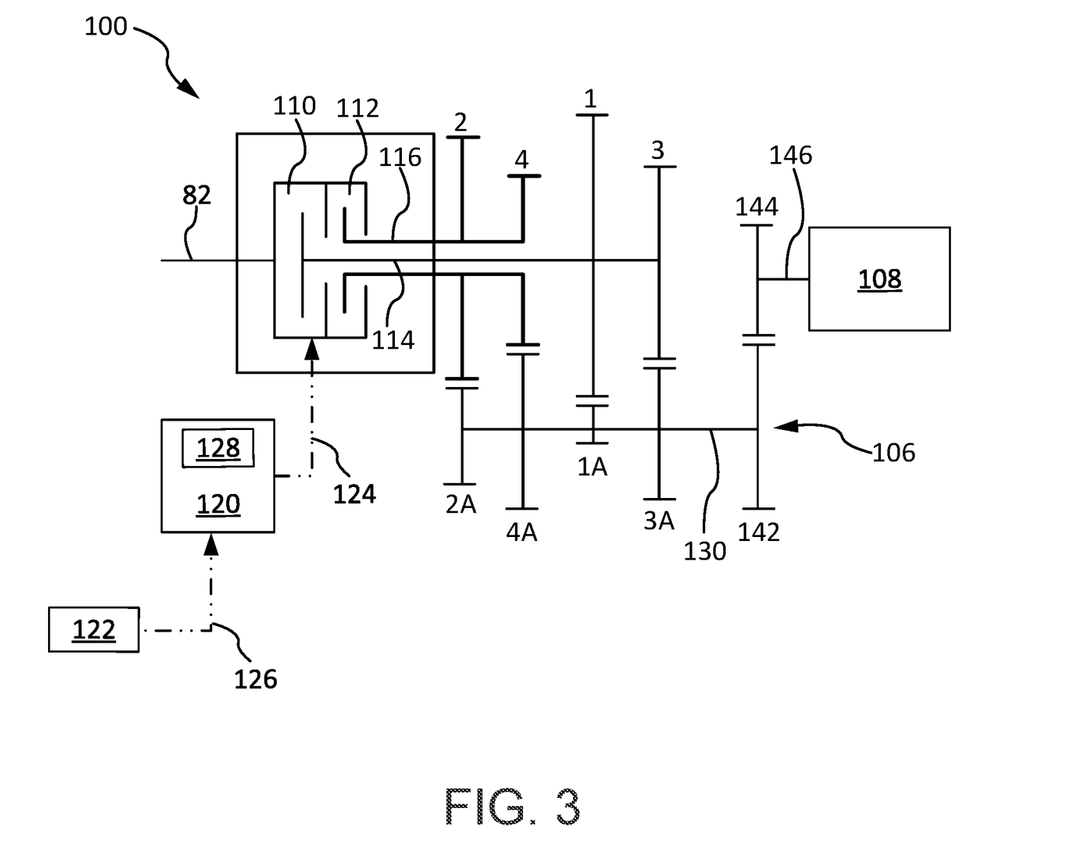
FIG. 3 illustrates a schematic of a dual clutch transmission coupled between a low spool transmission and an accessory of a low accessory gearbox, in accordance with various embodiments.

Referring now to FIG. 3, additional details of DCT 100 are illustrated. In accordance with various embodiments, DCT 100 includes a first clutch 110 and a second clutch 112. First clutch 110 may drive odd gears 1 and 3 of DCT 100 via an inner (or first) transmission shaft 114. In this regard, first gear 1 and third gear 3 may be mounted to inner transmission shaft 114. Second clutch 112 may drive even gears 2 and 4 of DCT 100 via an outer (or second) transmission shaft 116. In this regard, second gear 2 and fourth gear 4 may be mounted to outer transmission shaft 116. First gear 1 may be configured to engage a first counter gear 1*a*, which may be mounted (e.g., by splined interface) to a countershaft 130 of DCT 100. Second gear 2 may be configured to engage a second counter gear 2*a* mounted to countershaft 130. Third gear 3 may be configured to engage a third counter gear 3*a* mounted to countershaft 130. Fourth gear 4 may be configured to engage a fourth counter gear 4*a* of countershaft 130. An output gear 142 of countershaft 130 is rotationally coupled to (e.g., intermeshed with) an input gear 144 of generator 108. Input gear 144 may be mounted or otherwise coupled to an input shaft 146 of generator 108. In this regard, torque may be transferred from countershaft 130 to input shaft 146 via output gear 142 and input gear 144. Stated differently, output 142 is configured to engage input 144, thereby driving a rotation of input shaft 146 and generator 108.

DCT 100 may comprise gears of varying gear ratios. For example, the gear ratios of first gear 1, second gear 2, third gear 3, and fourth gear 4 relative to their respective counter gear 1*a*, 2*a*, 3*a*, 4*a*, may be selected such that the rotational speed of countershaft 130 (i.e., the output speed of DCT 100) remains within a predetermined range. For example, in various embodiments, DCT 100 may be configured such that the output speed of DCT 100 (e.g., the rotational speed of countershaft 130) is between 5,000 and 25,000 revolutions per minute (RPM), between 7,500 RPM and 20,000 RPM, or between 10,000 RPM and 16,000 RPM. In various embodiments, the ratio of first gear 1 to first counter gear 1*a* is between 1:15 and 1:3, between 1:10 and 1:4, or about 1:5, wherein in the previous context only, "about" means±0.5. In various embodiments, the ratio of second gear 2 to second counter gear 2*a* is between 1:7 and 1:2, between 1:4 and 1:2.5, or about 1:3.2, wherein in the previous context only, "about" means±0.5. In various embodiments, the ratio of third gear 3 to third counter gear 3*a* is between 1:4 and 1:1.5, between 1:3 and 1:2, or about 1:2.2, wherein in the previous context only, "about" means±0.5. In various embodiments, the ratio of fourth gear 4 to fourth counter gear 4*a* is between 1:3 and 1:1, between 1:2 and 1:1.1, or about 1:1.4, wherein in the previous context only, "about" means±0.5. In various embodiments, each of the gear ratio of DCT 100 is selected to increase a rotational speed of countershaft 130 relative to the rotational speed of low lay shaft 82 (i.e., relative to the input of DCT 100). While DCT 100 is illustrated as having four gears (i.e., first gear 1, second gear 2, third gear 3, and fourth gear 4), it is further contemplated and understood that DCT 100 may include any number of gears. For example, DCT 100 may include greater than four gears, such as five gears or six gears, or fewer than four gears such as two gears or three gears.

Power extraction system 102 may further comprise a controller 120 and one or more sensor(s) 122 configured to output data, related to an operational condition of gas turbine engine 20, to controller 120. Controller 120 may be in operable communication with DCT 100. In this regard, controller 120 may be in communication with first clutch 110 and second clutch 112 via one or more links 124. In various embodiments, links 124 may represent a wired communication, a wireless communication, a mechanical communication (i.e., a shaft, rod, lever, conduit, cord, etc.) or any other link capable of operatively coupling controller 120 with first clutch 110 and second clutch 112. In various embodiments, controller 120 may comprise a full authority digital engine control (FADEC) system. Controller 120 may be positioned on the aircraft and may control operation of DCT 100 based on data received from sensor(s) 122. Sensor(s) 122 may be configured to detect parameters related to an operating condition of gas turbine engine 20. For example, sensor(s) 122 may detect a rotational speed of a portion of gas turbine engine 20 (e.g., a rotational speed of inner shaft 40), a temperature of a portion of gas turbine engine 20, a pressure within a portion of gas turbine engine 20, a thrust ratio the gas turbine engine 20, an air flow ratio of gas turbine engine 20, a flow parameter at a given station of gas turbine engine 20, or the like. Sensor(s) 210 may be in communication with controller via links 126. Links 126 may represent a wired communication, a wireless communication, a mechanical communication, or any other link capable of operatively coupling controller 120 and sensors 122.

Controller 120 may provide control signals to various elements of DCT 100. For example, in response to data output from sensor(s) 122, controller 120 may send engage and disengage commands to first clutch 110 and second clutch 112. In various embodiments, the commands may cause an actuation of first clutch 110 and/or second clutch 112 that changes the gear ratio driving countershaft 130. Controller 120 may be configured to select the desired gear ratio of DCT 100 based on the data output from sensors 122 (e.g., based on the rotational speed of inner shaft 40) and such that countershaft 130 rotates at a generally constant speed. Stated differently, controller 120 is configured to decrease a range of the rotational speeds experienced by countershaft 130 and/or by the accessories rotationally coupled to countershaft 130.

In accordance with various embodiments, controller 120 may be configured such that when shifting between gears, first clutch 110 or second clutch 112 is commanded to disengage and the other of first clutch 110 or second clutch 112 is commanded to engage. For example, in response to receiving engine data from sensors 122, controller 120 may compare a rotational speed of low lay shaft 82 or low spool 30 to one or more threshold speeds. If controller 120 determines a rotational speed of low lay shaft 82 or low spool 30 is greater than a predetermined threshold speed, controller 120 may determine that the gear ratio of DCT 100 should be decreased (i.e., controller causes DCT 100 to "up shift"). If controller 120 determines a rotational speed of low lay shaft 82 is less than a predetermined threshold speed, controller 120 may determine that the gear ratio of DCT 100 should be increased (i.e., controller 120 causes DCT 100 to "down shift"). For example, if DCT 100 is in first gear 1 and controller 120 determines an up shift is needed (e.g., the rotational speed of low spool 32 or low lay shaft 82 is greater than a predetermined first gear maximum threshold speed), controller 120 may send an engage command to second clutch 112, thereby causing second clutch 112 to translate to an engaged state, wherein countershaft 130 is rotated by second gear 2 or fourth gear 4, depending on the desired gear ratio. Controller 120 may simultaneously send a disengage command to first clutch 110, thereby causing first clutch 110 to translate to a disengaged state, wherein countershaft 130 is no longer rotated by first gear 1. If, for example, DCT 100 is in fourth gear 4 and controller 120 determines a down shift is needed (e.g., the rotational speed of low spool 32 or low lay shaft 82 is less than a predetermined fourth gear minimum threshold speed), controller 120 may send an engage command to first clutch 110, thereby causing first clutch 110 to translate to an engaged state, wherein countershaft 130 is rotated by first gear 1 or third gear 3, depending on the desired gear ratio. Controller 120 may simultaneously send a disengage command to second clutch 112, thereby causing second clutch 111 to translate to a disengaged state, wherein countershaft 130 is no longer rotated by fourth gear 4.

In accordance with various embodiments, when first clutch 110 is in the engaged state, second clutch is in the disengaged state and rotation of countershaft 130 is driven by either first gear 1 or third gear 3, depending on the rotational speed of low lay shaft 82. For example, rotation of countershaft 130 may be driven by first gear 1 at slower rotational speeds of low lay shaft 82 as compared to the rotational speeds of low lay shaft 82 associated with third gear 3 driving rotation of countershaft 130. When second clutch 112 is in the engaged state, first clutch 110 is in the disengaged state and rotation of countershaft 130 is driven by either second gear 2 or fourth gear 4, depending on the rotational speed of low lay shaft 82. For example, rotation of countershaft 130 is driven by second gear 2 at slower rotational speeds of low lay shaft 82 as compared to the rotational speeds of low lay shaft 82 associated with fourth gear 4 driving rotation of countershaft 130.

DCT 100 having dual clutches tends to allow for uninterrupted power delivery to generator 108. DCT 100 allows generator 108 to be rotationally coupled to the low spool 30, without tending to experience the span of variation in rotational speed of low spool 30.

Figure 5A:
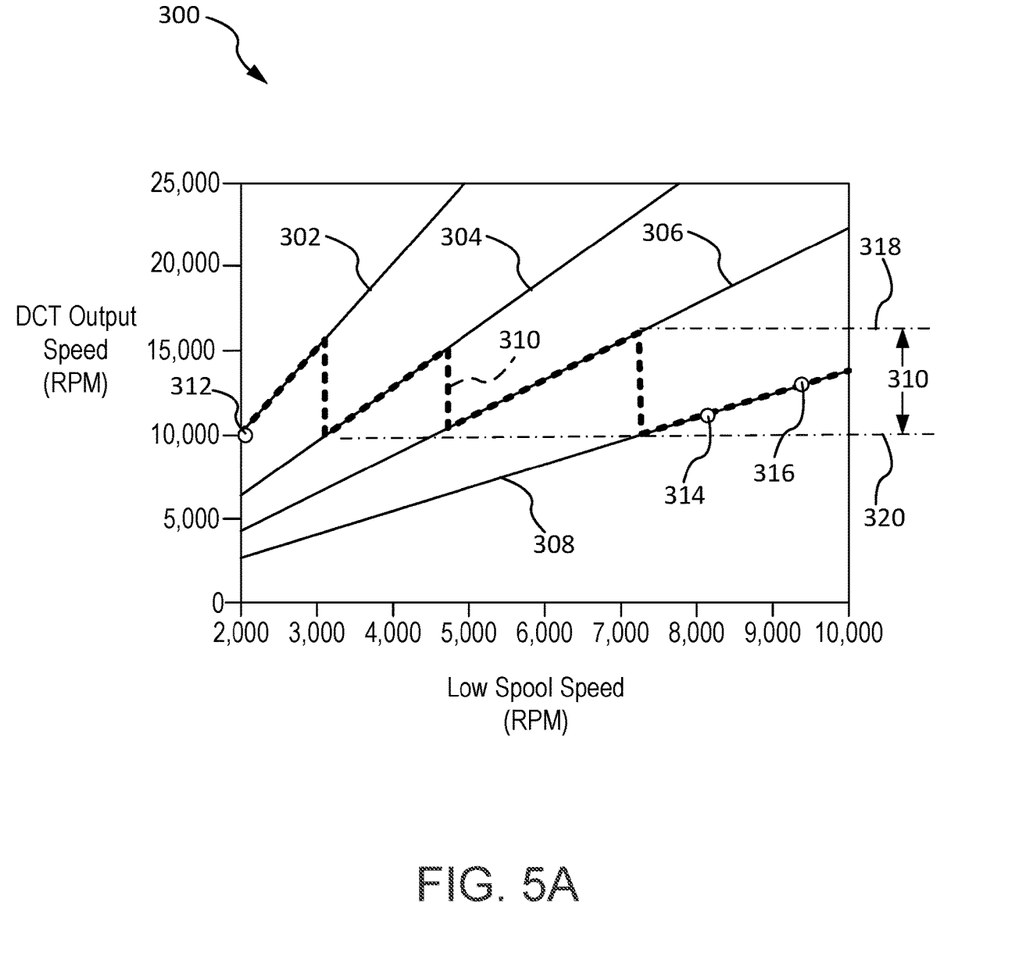
FIG. 5A illustrates a graphical representation of a power extraction system having a four speed dual clutch transmission, in accordance with various embodiments.

With additional reference to FIG. 5A, a graphical representation 300 of power extraction system 102 having four speed DCT 100 rotationally coupled to low spool 32 of gas turbine engine 20 is illustrated. Rotational speeds of the output of DCT 100 (e.g., countershaft 130 in FIG. 3) are represented on the vertical (or "Y") axis of graph 300. Rotational speeds of the low spool (e.g., inner shaft 40 in FIG. 1) are represented on the horizontal (or "X") axis of graph 300. Line 302 represents the rotational output speed of first gear 1. Line 304 represents the rotational output speed of second gear 2. Line 306 represents the rotational output speed of third gear 3. Line 308 represents the rotational output speed of fourth gear 4. Line 310 represents the rotational speed of countershaft 130. Point 312 represents an idle operating condition of engine 20. Point 314 represents a cruise operating condition of engine 20. Point 316 represents a take-off operating condition of engine 20.

As illustrated in FIG. 5A, controller 120 may be configured to cause DCT 100 to be in first gear 1, such that first gear 1 is driving rotation of countershaft 130, from a low spool speed of about 2,000 RPM to about 3,000 RPM, wherein in the previous context only, "about" means±500 RPM. In response to the low spool speed exceeding 3,000 RPM (or any desired speed threshold), controller 120 may upshift to DCT 100 to second gear, by commanding first clutch 110 to translate to the disengaged state and commanding second clutch 112 to translate to the engaged state, wherein second gear 2 drives countershaft 130. In response to the upshift from first gear to second gear, the rotational speed of countershaft 130 decreases to approximately 10,000 RPM. Controller 120 may be further configured to cause DCT 100 to be in second gear between low spool speeds of about 3000 RPM and about 4,800 RPM, wherein in the previous context only, "about" means±500 RPM. In response to the low spool speed exceeding 4,800 RPM (or any desired speed threshold), controller 120 may upshift to DCT 100 to third gear, by commanding second clutch 112 to translate to the disengaged state and commanding first clutch 110 to translate to the engaged state, wherein third gear 3 drives countershaft 130. In response to the upshift from second gear to third gear, the rotational speed of countershaft 130 decreases to approximately 10,000 RPM. Controller 120 may be further configured to cause DCT 100 to be in third gear between low spool speeds of about 4,800 RPM and about 7,200 RPM, wherein in the previous context only, "about" means±500 RPM. In response to the low spool speed exceeding 7,200 RPM (or any desired speed threshold), controller 120 may upshift to DCT 100 to fourth gear, by commanding first clutch 110 to translate to the disengaged state and commanding second clutch 112 to translate to the engaged state, wherein fourth gear 4 drives countershaft 130. In response to the upshift from third gear to fourth gear, the rotational speed of countershaft 130 decreases to approximately 10,000 RPM. Controller 120 may be configured to shift DCT 100 into fourth gear prior to point 314.

While controller 120 has been described as making shifting decisions based on the rotational speed of low spool 32, it is further contemplated and understood that the shifting decisions may be based on other rotational speeds, for example, the rotational speed of low lay shaft 82 or the rotational speed of countershaft 130. For example, controller 120 may be configured to upshift anytime the rotational speed of countershaft 130 exceeds a preselected maximum DCT output speed threshold 318. For example, as shown in FIG. 5A, controller 120 may be configured to upshift DCT 100, if controller 120 determines the rotational speed of countershaft 130 is greater than about 15,100 RPM, wherein in the previous context only, "about" means±500 RPM. Similarly, controller 120 may be configured to downshift DCT 100, if the rotational speed of countershaft 130 is less than preselected minimum DCT output speed threshold 330. For example, as shown in FIG. 5A, controller 120 may be configured to downshift DCT 100, if controller 120 determines the rotational speed of countershaft 130 is less than about 10,000 RPM, wherein in the previous context only, "about" means±500 RPM. Controller 120 and DCT 100 of power extraction system 120 are thus configured to maintain the speed of countershaft 130 within a variance 310.

Figure 5B:
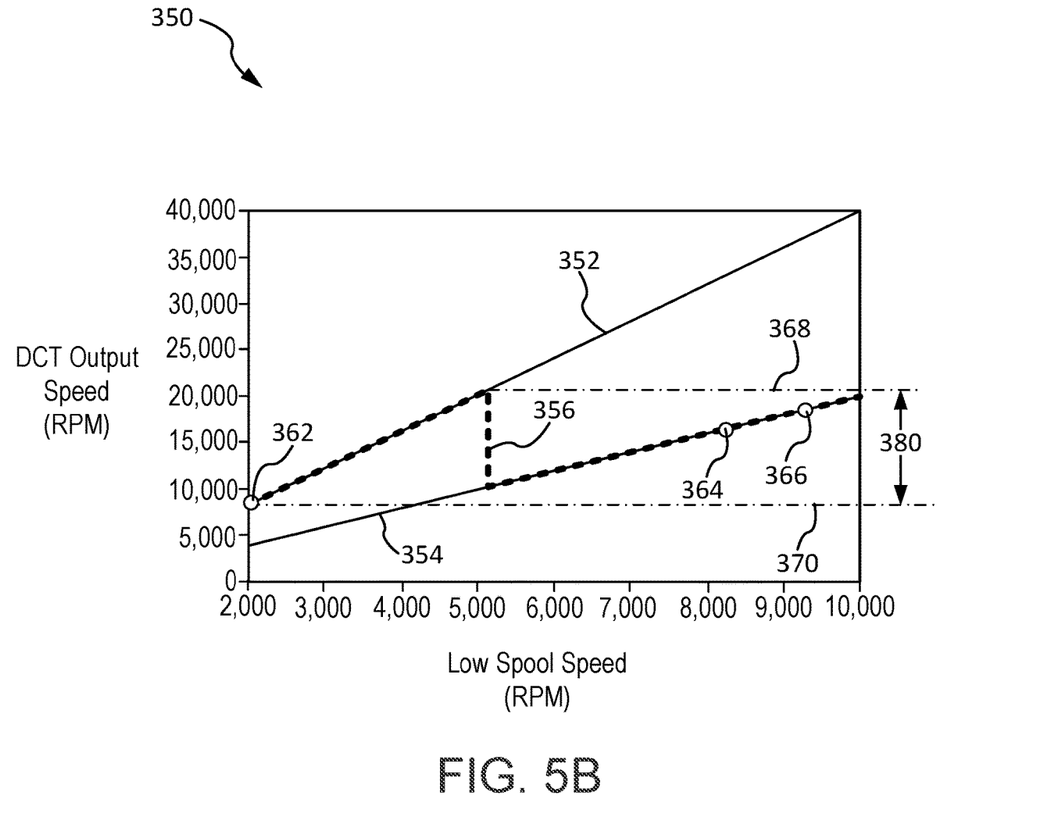
FIG. 5B illustrates a graphical representation of a power extraction system having a two speed dual clutch transmission, in accordance with various embodiments.

With additional reference to FIG. 5B, a graphical representation 350 of a power extraction system having a two speed DCT rotationally coupled to low spool 32 of gas turbine engine 20 is illustrated. In various embodiments, the two speed DCT may replace four speed DCT 100 in power extraction system 102. Rotational speeds of the output (i.e., countershaft) of the two speed DCT are represented on the vertical (or "Y") axis of graph 350. Rotational speeds of the low spool (e.g., inner shaft 40 in FIG. 1) are represented on the horizontal (or "X") axis of graph 350. Line 352 represents the rotational output speed of a first gear of the two speed DCT. Line 354 represents the rotational output speed of a second gear of the two speed DCT. Line 356 represents the rotational speed of the countershaft of the two speed DCT. Point 362 represents an idle operating condition of engine 20. Point 364 represents a cruise operating condition of engine 20. Point 366 represents a take-off operating condition of engine 20. A controller, similar to control 120, may make shifting decision and/or otherwise control the two speed DCT. The controller may be configured to maintain a rotational speed of the two speed DCT between a preselected maximum DCT output speed threshold 368 and a preselected minimum DCT output speed threshold 370. The controller and the two speed DCT are thus configured to maintain the speed of the DCT output within a variance 380.

Figure 4A:
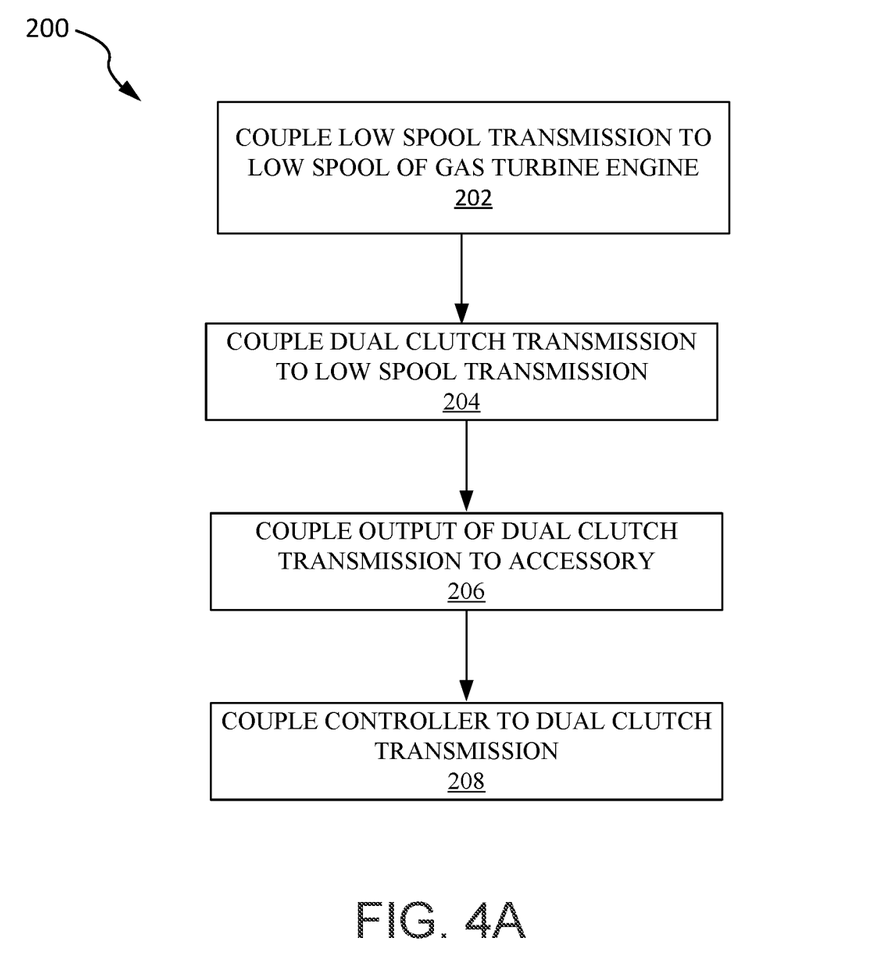
FIGS. 4A and 4B illustrate a method of forming a power extraction system for a gas turbine engine, in accordance with various embodiments.
Figure 4B:
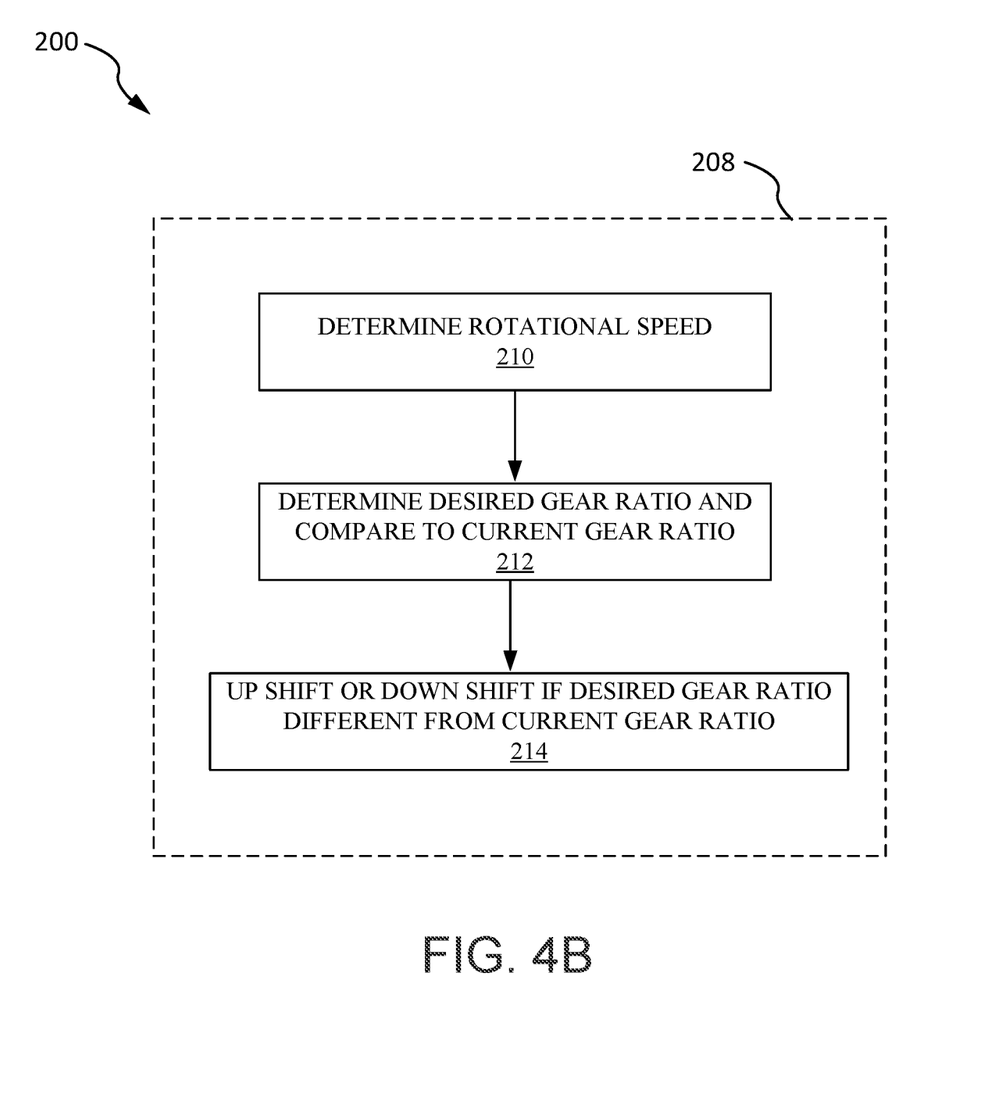

With reference to FIGS. 4A and 4B, a method 200 of forming a power extraction system in a gas turbine engine is illustrated, in accordance with various embodiments, method 200 may include rotationally coupling a low spool transmission to a low spool of the gas turbine engine (step 202), rotationally coupling a dual clutch transmission to the low spool transmission (step 204), and rotationally coupling an output of the dual clutch transmission to an input of an accessory of a low accessory gearbox (step 206).

In various embodiments, method 200 may further include operationally coupling a controller to the dual clutch transmission (step 208). In various embodiments, step 208 may include configuring the controller to determine a rotational speed of the low spool or the low spool transmission (step 210). In various embodiments, step 208 may include configuring the controller to determine a desired gear ratio based on the determined rotational speed and compare the desired gear ratio to a current or actual gear ratio of the dual clutch transmission (step 212). In various embodiments, step 208 may further include configuring the controller to up shift or down shift the dual clutch transmission if the desired gear ratio does not match the current gear ratio (step 214). In various embodiments, step 214 may include the controller commanding a first clutch of the dual clutch transmission to translate to an engaged position while simultaneously commanding a second clutch of the dual clutch transmission to translate to a disengaged position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power extraction system for a gas turbine engine, comprising:
   a low spool transmission including a low tower shaft and a low lay shaft rotationally coupled to the low tower shaft; and
   a low spool accessory gearbox comprising a generator and a dual clutch transmission coupled between the low spool transmission and the generator, wherein the dual clutch transmission includes:
   a first clutch;
   a first transmission shaft operationally coupled to the first clutch;
   a second clutch;
   a second transmission shaft operationally coupled to the second clutch;
   a plurality of gears including at least a first gear coupled to the first transmission shaft and a second gear coupled to the second transmission; and
   a countershaft including a plurality of counter gears, the counter gears being configured to engage the plurality of gears, wherein gear ratios for all of the gears of the plurality of gears relative to the counter gears of the plurality of counter gears are configured to increase a rotational speed of the countershaft relative to a rotational speed of the low lay shaft.

2. The power extraction system of claim 1, wherein the plurality of gears further comprises:
a third gear mounted to the first transmission shaft; and
a fourth gear mounted to the second transmission shaft.

3. The power extraction system of claim 1, wherein an output gear of the countershaft is configured to drive a rotation of an input shaft of the generator.

4. The power extraction system of claim 1, wherein the low lay shaft forms an input shaft of the dual clutch transmission.

5. The power extraction system of claim 4, further comprising:
a high spool transmission; and
a high accessory gearbox including a first accessory operationally coupled to the high spool transmission.

6. The power extraction system of claim 5, wherein the high spool transmission comprises:
a high tower shaft; and
a high lay shaft rotationally coupled to the high tower shaft, and wherein the high accessory gearbox comprises a gear train, the gear train including an input gear rotationally coupled to high lay shaft.

7. A gas turbine engine, comprising:
a high spool and a low spool;
a high spool transmission mechanically coupled to the high spool;
a low spool transmission mechanically coupled to the low spool; and
a low accessory gearbox comprising a generator and a dual clutch transmission coupled between the low spool transmission and the generator, the dual clutch transmission including:
a first clutch;
a first transmission shaft operationally coupled to the first clutch;
a second clutch;
a second transmission shaft operationally coupled to the second clutch;
a plurality of gears including at least a first gear coupled to the first transmission shaft and a second gear coupled to the second transmission; and
a countershaft including a plurality of counter gears, the counter gears being configured to engage the plurality of gears, wherein gear ratios for all of the gears of the plurality of gears relative to the counter gears of the plurality of counter gears are configured to increase a rotational speed of the countershaft relative to a rotational speed of the low lay shaft.

8. The gas turbine engine of claim 7, further comprising:
a controller operationally coupled to the first clutch and the second clutch; and
a tangible, non-transitory memory configured to communicate with the controller, the tangible, non-transitory memory having instructions stored thereon that, in response to execution by the controller, cause the controller to perform operations comprising:
determining, by the controller, a rotational speed of at least one of the low spool transmission or the low spool; and determining, by the controller, a desired gear ratio of the dual clutch transmission based on the rotational speed of the at least one of the low spool transmission or the low spool.

9. The gas turbine engine of claim 8, wherein the operations further comprise:
determining, by the controller, if the desired gear ratio of the dual clutch transmission matches a current gear ratio of the dual clutch transmission;
commanding, by the controller, the first clutch to engage if the desired gear ratio of the dual clutch transmission does not match the current gear ratio of the dual clutch transmission; and
commanding, by the controller, the second clutch to disengage if the desired gear ratio of the dual clutch transmission does not match the current gear ratio of the dual clutch transmission.

10. The gas turbine engine of claim 7, wherein an output gear of the countershaft is configured to drive a rotation of an input shaft of the generator.

11. The gas turbine engine of claim 10, wherein the plurality of gears further comprises:
a third gear mounted to the first transmission shaft; and
a fourth gear mounted to the second transmission shaft.

12. The gas turbine engine of claim 7, wherein the low spool transmission comprises:
a low tower shaft rotationally coupled to the low spool; and
a low lay shaft rotationally coupled to the low tower shaft, wherein the low lay shaft forms an input shaft of the dual clutch transmission.

13. The gas turbine engine of claim 12, wherein the high spool transmission comprises:
a high tower shaft rotationally coupled to the high spool;
a high lay shaft rotationally coupled to the high tower shaft; and
a high spool accessory gearbox including a first accessory and a gear train operationally coupled to the first accessory, the gear train including an input gear rotationally coupled to the high lay shaft.

14. A method of forming a power extraction system for a gas turbine engine, comprising:
coupling a low spool transmission to a low spool of the gas turbine engine, wherein the low spool transmission includes a low tower shaft rotationally coupled to the low spool and a low lay shaft rotationally coupled to the low tower shaft;
coupling a dual clutch transmission to the low spool transmission, wherein the low lay shaft forms an input shaft of the dual clutch transmission, and wherein the dual clutch transmission comprises:
a first clutch;
a first transmission shaft operationally coupled to the first clutch;
a second clutch;
a second transmission shaft operationally coupled to the second clutch;
a plurality of gears including at least a first gear coupled to the first transmission shaft and a second gear coupled to the second transmission; and
a countershaft including a plurality of counter gears configured to engage the plurality of gears, wherein gear ratios for all of the gears of the plurality of gears relative to the counter gears of the plurality of counter gears are configured to increase a rotational speed of the countershaft relative to a rotational speed of the low lay shaft; and rotationally coupling an output gear of the countershaft to an input gear of an accessory of a low accessory gearbox.

15. The method of claim 14, further comprising operationally coupling a controller to the dual clutch transmission, the controller including a tangible, non-transitory memory configured to communicate with the controller, the tangible, non-transitory memory having instructions stored thereon that, in response to execution by the controller, cause the controller to perform operations comprising:

determining, by the controller, a rotational speed of at least one of the low spool transmission or the low spool; and determining, by the controller, a desired gear ratio of the dual clutch transmission based on the rotational speed of the at least one of the low spool transmission or the low spool.

16. The method of claim 15, wherein the operations further comprise:

determining, by the controller, if the desired gear ratio of the dual clutch transmission matches a current gear ratio of the dual clutch transmission;

commanding, by the controller, the first clutch to engage if the desired gear ratio of the dual clutch transmission does not match the current gear ratio of the dual clutch transmission; and commanding, by the controller, the second clutch to disengage if the desired gear ratio of the dual clutch transmission does not match the current gear ratio of the dual clutch transmission.

17. The method of claim 16, wherein the determining, by the controller, the rotational speed of the at least one of the low spool transmission or the low spool comprises:

receiving, by the controller, a signal from a sensor configured to measure an operating condition of the gas turbine engine.

18. The method of claim 17, wherein the accessory of the low accessory gearbox comprises a generator.

* * * * *